United States Patent [19]

Khachigian

[11] 4,031,584
[45] June 28, 1977

[54] THREADING ATTACHMENT FOR TURNING MACHINES

[76] Inventor: John Khachigian, 78-80 Capitol Ave., Hartford, Conn. 06103

[22] Filed: June 8, 1976

[21] Appl. No.: 694,032

[52] U.S. Cl. .............................. 10/89 H; 10/89 F; 10/135 R; 10/141 H; 408/142

[51] Int. Cl.² ....................... B23G 1/00; B23G 3/00

[58] Field of Search ............. 10/89 F, 89 H, 129 R, 10/134, 135 R, 141 H; 408/132, 134, 139, 140, 142

[56] References Cited

UNITED STATES PATENTS

| 770,966 | 9/1904 | Hunter | 10/89 H |
|---|---|---|---|
| 2,340,477 | 2/1944 | Kruse | 10/129 R |
| 2,378,659 | 6/1945 | Ross | 408/139 |
| 3,011,185 | 12/1961 | Khachigian | 10/129 R |
| 3,179,965 | 4/1965 | Khachigian | 10/129 R |
| 3,717,892 | 2/1973 | Johnson | 10/89 F |
| 3,821,826 | 7/1974 | Khachigian | 10/134 |
| 3,829,230 | 8/1974 | Johnson | 10/141 H |
| 3,831,214 | 8/1974 | Alfredeen | 10/89 H |

Primary Examiner—E. M. Combs
Attorney, Agent, or Firm—McCormick, Paulding & Huber

[57] ABSTRACT

An improved threading attachment for turning machines incorporates a carrier for holding a tool such as a tap, a stationary supporting arbor and a sliding spindle extending between the arbor and carrier in coaxial relationship with the tap. The spindle shifts axially relative to the carrier and arbor and automatically disengages the carrier from the arbor to terminate a thread cutting operation when the tap has advanced through a hole by a predetermined amount or has bottomed in a blind hole.

10 Claims, 5 Drawing Figures

U.S. Patent
June 28, 1977
4,031,584
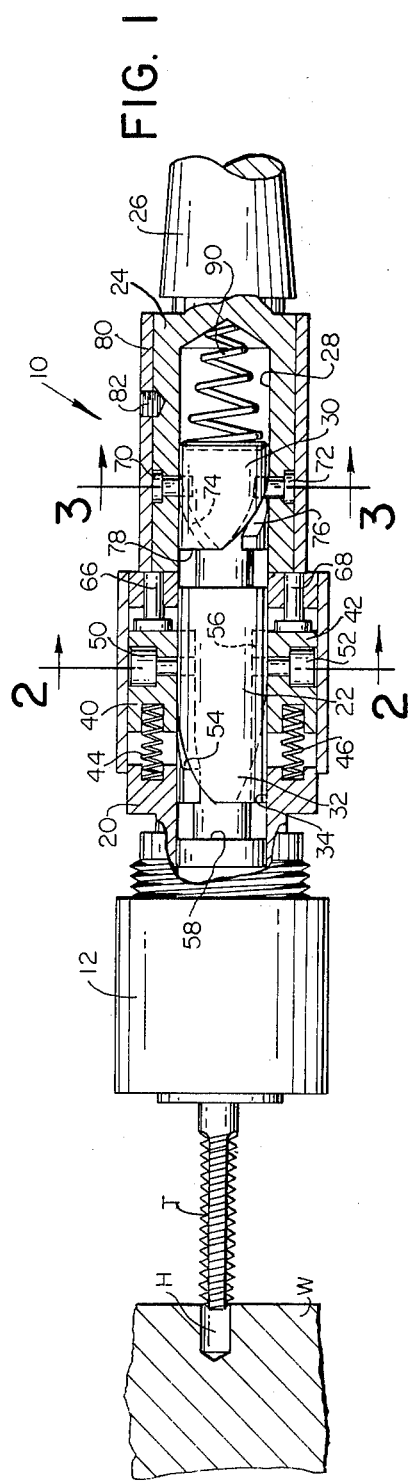
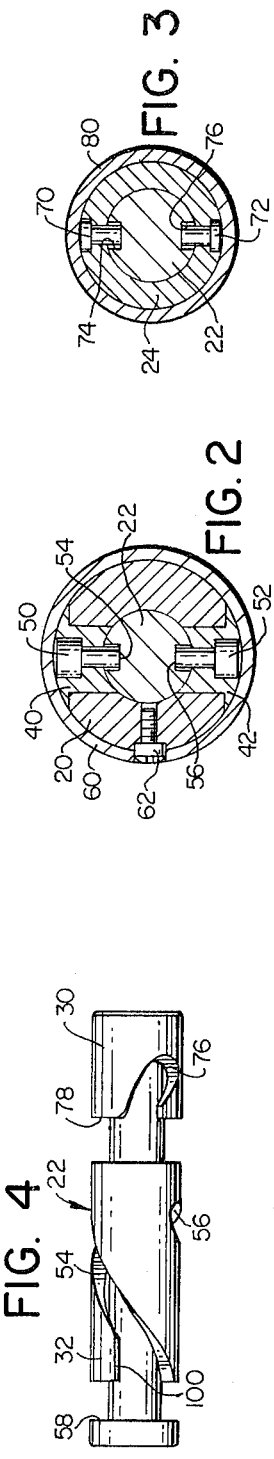
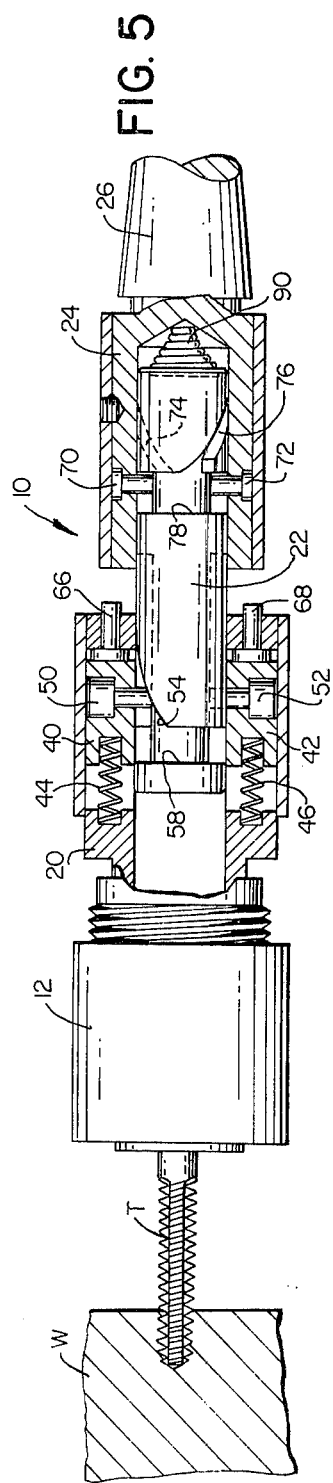
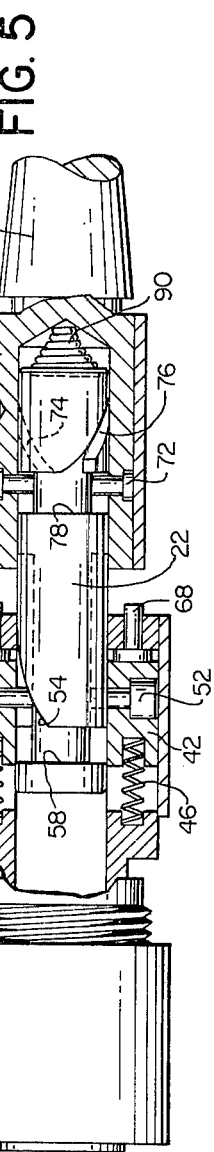
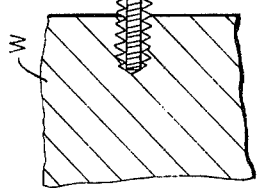

THREADING ATTACHMENT FOR TURNING MACHINES

BACKGROUND OF THE INVENTION

The present invention relates to an attachment for holding a thread cutting tool in a turning machine such as a lathe, and constitutes an improvement over prior art attachments such as shown in my U.S. Pat. No. 3,011,185 issued Dec. 5, 1961, U.S. Pat. No. 3,179,965 issued Apr. 27, 1965 and 3,821,826 issued July 2, 1974.

In my U.S. Pat. No. 3,821,826, an attachment is disclosed in which a tap is fixedly connected to a carrier slidably mounted on a stationary spindle in a turning machine. A releasable torque transmitting connection is formed between the spindle and carrier and automatically uncouples the tool and spindle and thus terminates a thread cutting operation after the tool has advanced a predetermined amount into or through the workpiece. If, however, it is desired to cut threads in a blind pilot hole, then special set up and starting operations must be followed otherwise the tap reaches the bottom of the blind hole and attempts to continue advancing into the hole with resulting damage to either the workpiece, the tool, the attachment or the turning machine.

It is, accordingly, a general object of the present invention to provide an improved threading attachment for a turning machine which permits the tapping of either through-holes or blind holes without damaging the thread cutting equipment and also without special set up procedures beforehand.

SUMMARY OF THE INVENTION

The present invention resides in an improved threading apparatus for supporting a thread cutting tool in a turning machine such as a lathe during a thread cutting operation. The apparatus starts the tool into the workpiece at the beginning of a cutting operation, holds the tool during the cutting operation and automatically releases the tool to terminate the cutting operation after a predetermined length of threading has been cut, or after the cutting tool bottoms, whichever occurs first. The apparatus is therefore, suitable for cutting threads in either through- or blind holes.

The improved threading apparatus is comprised of a tool carrier which connects rigidly with the thread cutting tool and holds the tool on axis during a thread cutting operation. A support member or arbor located remotely of the tool carrier and the cutting tool connects in rigid engagement with the turning machine to support the tool and tool carrier during the cutting operation. The arbor may, for example, be attached to the tail stock of a lathe and the workpiece in which the threads are cut is then connected to the rotating chuck of the head stock.

A sliding spindle extends between the tool carrier and the arbor in axial alignment with the tool in the carrier. The spindle in one embodiment of the invention has cylindrical end portions so that it slides axially relative to the carrier and arbor and rotates relative to at least one of them. A disengagable, torque transmitting means is interposed between the carrier and spindle. The transmitting means includes a tang mounted in either the spindle or the carrier to engage grooves in the carrier or spindle respectively. One of the grooves is an axially extending groove having a helical side portion against which the tang operates during a thread cutting operation. An annular groove is joined with the axially extending groove at one end to effectively disengage the torque transmitting means when the tang advances axially with the tool and reaches the annular groove.

Another torque transmitting means is interposed between the arbor and the spindle and also permits axial translation of these members relative to one another. Thus, the spindle may be shifted axially relative to both the carrier and the arbor and in so doing disengages the torque transmitting means to terminate the thread cutting operation. Resilient means are provided between the spindle and either the carrier or the arbor to urge the spindle into a position in which the tang of the first torque transmitting means is engaged with the axially extending groove so that thread cutting can be carried out.

BRIEF DESCRIPTION OF THE DRAWINGS

FIG. 1 is a side view, partially in section, of the threading apparatus of the present invention holding a tap adjacent a workpiece at the beginning of a thread cutting operation.

FIG. 2 is an axial cross-section of the threading apparatus in FIG. 1 as viewed along the sectioning line 2—2.

FIG. 3 is also an axial cross-section of the threading apparatus in FIG. 1 as viewed along the sectioning line 3—3.

FIG. 4 is a side view of the spindle of the threading apparatus rotated slightly from the position of the spindle shown in FIG. 1.

FIG. 5 is a side view, partially in section of the threading apparatus with the tap bottomed in a blind pilot hole after threads have been cut.

DESCRIPTION OF THE PREFERRED EMBODIMENTS

FIG. 1 illustrates my improved threading apparatus suitable for cutting threads in either through- or blind pilot holes. As illustrated, the apparatus, generally designated 10, has a chuck 12 at one end supporting a cutting tap T at the lip of a blind pilot hole H in a workpiece W. The apparatus or attachment 10 is utilized as an attachment for a turning machine such as a lathe, and in a typical thread cutting operation, the attachment is mounted in a non-rotating portion of the machine such as the tail stock while the workpiece W is mounted in the rotating portion of the machine such as the chuck in the head stock of the lathe. It should be understood, however, that the attachment may be mounted in the rotating portion while the workpiece is mounted in the non-rotating portion of the machine. Also, the attachment may be utilized to generate external threads on a shaft by mounting a die in the lathe chuck and the shaft in the chuck 12 of the attachment rather than a tap.

In accordance with the present invention, the threading attachment 10 includes a carrier 20 on which the chuck 12 is mounted, a sliding spindle 22 and an arbor 24 serving as a supporting member for the attachment in the turning machine. The arbor 24 may include a taper 26 which is drawn snuggly into the tail stock of a lathe to bring the axis of the attachment and axis of rotation of the lathe into coincidence and has a central bore 28 extending partially through the arbor from the end confronting the carrier 20 to the taper. The spindle 22 has a cylindrical end portion 30 which fits snuggly within the bore 28 for axial and rotational movement relative to the arbor. The opposite end portion 32 of the spindle 24 is also cylindrical and fits within a bore 34 of the carrier 20 for axial and rotational movement relative to the carrier. Thus, both rotational and axial displacement of the spindle within the carrier and arbor is possible.

As shown in FIGS. 1 and 2, a pair of slide blocks 40 and 42 are mounted in axially extending cutouts in the carrier 20 and the length of the cutouts is greater than the corresponding length of the slide blocks so that the blocks may be shifted axially of the carrier within the cutouts but are restrained as shown in FIG. 2 to rotate with the carrier 20, the chuck 12 and the tap T about the axis of the attachment 10. A pair of coil springs 44 and 46 are interposed between the respective slide blocks and the carrier within the cutouts to urge the blocks toward the rear end of the attachment opposite the chuck 12. Mounted within the slide blocks 40 and 42 are pins or tangs 50 and 52 respectively and the pins project inwardly of the slide blocks into the bore 34 of the carrier 20. As shown most clearly in FIG. 2, the inner ends of the pins 50 and 52 engage axially extending, helical grooves 54 and 56 respectively formed in the periphery of the cylindrical end portion 34 of the spindle 22. The spindle 22 is illustrated in FIG. 4 in isolation and the grooves 54 and 56 are clearly visible. Joining with the forward end of the axially extending grooves 54 and 56 is an annular groove 58 which completely circumscribes the spindle. A sleeve 60 circumscribes the portion of the carrier 20 containing the slide blocks 40 and 42 and is held in place on the carrier by means of a screw 62 to hold both the slide blocks and the tangs in the grooves of the spindle.

It will be understood that as long as the tangs 50 and 52 remain engaged with any portion of the axially extending grooves 54 and 56 and the spindle 22 maintains a fixed axial position within the carrier 20, a torque can be transmitted between the spindle and carrier. However, when the spindle 22 is shifted axially within the bore 34 of the carrier so that the tangs 50 and 52 fall within the annular groove 58, torque is not transmitted between the spindle and carrier. Thus, the torque transmitting connection defined by the tangs and grooves is a disengagable connection functioning in response to the axial position of the spindle within the carrier.

A pair of starting pins 66 and 68 in FIG. 1 abut the rear of the slide blocks 40 and 42 respectively and extend rearwardly through the carrier 20. As shown at the beginning of a threading operation, the start pins and slide blocks are pressed forwardly against the springs 44 and 46 by the arbor 24, and the springs in turn press the carrier 20 and tap T resiliently against the workpiece W to provide the necessary pressure for starting the tap into the pilot hole H. Thus, by appropriate positioning of the arbor 24 relative to the workpiece W a slight starting pressure is established.

Another disengageable torque transmitting connection is formed between the spindle 22 and the arbor 24 by means of a pair of pins or tangs 70 and 72 and grooves 74, 76 and 78 in the end portion 30 of the spindle 22. The grooves 74 and 76 are helical grooves extending axially along the cylindrical surface of the spindle and join with the annular groove 78 at their forward end. The tangs 70 and 72 are captured and fixed within the arbor 74 by means of a sleeve 80 and set screw 82. The tangs project radially inward of the arbor into the grooves 74 and 76 and, thus, couple the arbor and spindle together as long as the spindle maintains the illustrated axial position within the arbor bore 28. However, should the spindle shift rearwardly so that the tangs 70 and 72 enter the annular groove 78, then the spindle and arbor become disengaged or uncoupled.

Interposed between the end portion 30 of the spindle 22 and the arbor 24 is a conical coil spring 90 which urges the spindle forwardly of the arbor 24. Thus, in the absence of other forces on the spindle, the tangs 70 and 72 remain situated within the helical grooves 74 and 76 and the arbor and spindle remain torsionally interconnected. At the same time, the carrier 20 situated in contact with the arbor 24 is torsionally interconnected with the spindle 22 and also with the arbor 24. Thus, torsional restraint or driving forces may be transmitted through the attachment 10 from the arbor to the tap T.

OPERATION

As shown and described above, the threading attachment 10 with the tap T mounted in the chuck 12 is capable of tapping either through- or blind holes, and automatically uncouples the tap from the arbor 24 after the tap has advanced a predetermined distance through a hole or hit the bottom of a blind hole. By reversing the relative rotation of the workpiece and tap at the predetermined distance or at the bottom of a blind hole, the tap is automatically re-engaged with the arbor and may be backed out of the tapped hole.

THROUGH HOLES

In tapping a through-hole in the workpiece W having a depth no greater than a predetermined amount, the tap is initially placed in contact with the lip of the hole in the wokpiece and the arbor 24 is positioned against the start pins 66 and 68 as shown in FIG. 1 to generate the necessary starting pressure. The tap and workpiece are then rotated relative to one another and for the purpose of explanation, it will be assumed that the tap is held stationary in the tail stock of a lathe while the workpiece W is rotated in the chuck of the head stock. Since cutting oil cannot flow readily in the horizontal direction during a tapping operation, it is preferably that the hole be no deeper than two times the tap size.

As the tap T begins to cut threads within the hole H, the tangs 50 and 52 are rotated or thrust against one of the helical sidewalls of the grooves 54 and 56 respectively and, due to the helix angle of the sidewalls, a slight forward pressure is maintained against the springs 44 and 46 by the side blocks 40 and 42, and a slight rearward pressure against the spindle. However, the spindle remains substantially in the position illustrated in FIG. 1 due to the coil spring 90. The tangs 70 and 72 thus engage the axially extending grooves 74 and 76 in the rear portion of the spindle 22, and torsional restraint through the attachment 10 from the arbor 24 to the carrier 20 and chuck 12 is maintained. The tangs 50 and 52 progressively slide forwardly through the grooves 54 and 56 toward the annular groove 58 as the carrier 20 advances with the tap T. It will be noted that the grooves 54 and 56 are axially longer than the grooves 74 and 76.

When the tap T advances a predetermined distance equal to the axial length of the helical grooves 54 and 56, the tangs 50 and 52 drop into the annular groove 58 and torsional restraint of the tap T terminates. The tap T, the chuck 12 and the carrier 20 then rotate freely on the end portion 32 of the spindle 22 with the workpiece W. By selecting throughholes which are no deeper than the predetermined axial length of the grooves 54 and 56, tapping along the full depth can be accomplished and thereafter the attachment automatically places the tap in an idling mode until the turning machine is stopped.

When the tangs 50 and 52 enter the annular groove 58, the springs 44 and 46 are in compression. Thus, by stopping rotation of the workpiece W and reversing the rotation from that existing during the thread cutting operation, the springs 44 and 46 force the tangs 50 and 52 back into the grooves 54 and 56 and the tap is then backed out of the hole under power. To insure that the tangs 50 and 52 enter the grooves 54 and 56, the lands defining the grooves 54 and 56 are cut away as shown at 100 in FIG. 4. The operation of the threading attachment 10 with through-holes is thus substantially the same as that described in my U.S. Pat. No. 3,821,826 referenced above.

BLIND HOLES

In tapping a blind hole in a workpiece W which has a depth less than the axial length of the grooves 54 and 56 on the spindle 22, the tangs 50 and 52 do not reach the annular groove 58 before the tap T bottoms in the hole. It will be understood that when the tap T reaches the bottomed position, it can no longer advance into the workpiece, and the tap T, the chuck 12 and the carrier 20 must then rotate with the workpiece. As the tap begins to rotate, the forces generated by the tangs 50 and 52 against one sidewall of the left hand helical grooves 54 and 56 respectively increase substantially. If the helix angle of the grooves 54 and 56 is nominal, for example 30°, the tangs 50 and 52 by themselves may not thrust or displace the spindle 22 rearwardly in opposition to the forces generated by conical spring 90. However, the tangs 50 and 52 cause the spindle to rotate which in turn causes the tangs 70 and 72 to bear heavily against the sidewalls of the right hand helical grooves 74 and 76 respectively preferably having the same helix angle as the grooves 54 and 56 which overcomes the restraining force of coil spring 90. Therefore, the spindle 22 is instantly displaced rearwardly toward the taper 26 when the tap reaches the bottom of the hole.

Depending upon the depth of the blind hole, the rearward displacement of the spindle either brings the annular groove 58 into registration with the tangs 50 and 52 or, as shown in FIG. 5, brings the annular groove 78 into registration with the tangs 70 and 72. In either case, the tap T is uncoupled from the arbor 24. Thus, the threading attachment 10 assumes an idling condition when the tap T bottoms in a blind hole of the workpiece by shifting the spindle 22 between the carrier 20 and arbor 24 so that the annular grooves 58 or 78 are brought into registration with the tangs 50,52 or 70,72. Backing the tap out of the blind hole is accomplished by reversing the relative rotation of the workpiece and tap in the same manner as with a through-hole.

Thus, I have provided a threading attachment which is suitable for tapping either through-holes or blind holes in a rotating machine such as a lathe. The attachment automatically terminates the thread cutting operations whenever the tap has advanced a predetermined distance through a hole or when the tap bottoms in a blind hole.

While the present invention has been described in a preferred embodiment, it will be understood that numerous modifications and substitutions can be had without departing from the spirit of the invention. For example, the spindle 22 may be mounted exteriorly of rather than interiorly of the carrier and arbor. The start pins 66 and 68 are not essential since the machine operator may apply the axial thrust necessary to start the tap within the pilot hole of the workpiece. The helix angle of the grooves 54 and 56 provides the compression of springs 44 and 46 to condition the threading apparatus for removal of the tap at the end of a threading operation but may be eliminated if such feature is not desired. Alternately, the helix angle of the grooves 74 and 76 may be eliminated provided that the helix angle of the grooves 54 and 56 is adequate to drive the spindle rearwardly when the tap bottoms in a blind hole. At least one of the sets of grooves 54,56 or 74,76 must be provided with a helix angle to generate the rearward forces on the spindle. In the preferred embodiment of the invention, both sets of axially extending grooves have helix angles. Accordingly, the present invention has been described in a preferred embodiment by way of illustration rather than limitation.

I claim:

1. An improved threading apparatus for producing threads with a turning machine such as a lathe which rotates a workpiece and threading tool relative to one another comprising:
   a tool carrier member connectible in rigid engagement with a thread cutting tool for holding the tool on axis during a thread cutting operation;
   a support member located remotely of the tool carrier and the thread cutting tool and connectible in rigid engagement with the turning machine for supporting the tool and tool carrier in the machine during a thread cutting operation;
   a sliding spindle member extending between the tool carrier member and the support member in axial alignment with the tool, the spindle member being both axially translatable and rotatable relative to said carrier and support members;
   first disengagable torque transmitting means interposed between the carrier member and the spindle member including on one of the two members a first axially extending groove and a first annular groove joined with one end of the axially extending groove, and on the other of the two members a tang engaging the joined grooves;
   second disengagable torque transmitting means interposed between the support member and the spindle member and permitting axial translation of the two members relative to one another; and
   resilient means extending between the spindle member and one of the other members for urging the tang of the first torque transmitting means into the axially extending groove and away from the annular groove.

2. An improved threading apparatus for producing threads as defined in claim 1 wherein the axially extending groove of the first torque transmitting means has a helical side portion.

3. A threading apparatus for producing threads as defined in claim 2 wherein:
   the second torque transmitting means also includes on one of the spindle and support members a second axially extending groove having a helical side portion and a second annular groove joined with one end of the second axially extending groove, and on the other of the two members a tang engaging the joined grooves.

4. A threading apparatus for producing threads as defined in claim 3 wherein: the axially extending groove of the first torque transmitting means has a greater axial length than the axially extending groove of the second torque transmitting means.

5. A threading apparatus as defined in claim 3 wherein the axially extending grooves of the first and second torque transmitting means are formed in the spindle member and the tangs are mounted respectively in the carrier member and the support member.

6. A threading apparatus as defined in claim 3 wherein the helical wall portions of the axially extending grooves of the two torque transmitting means have right-hand and left-hand helixes respectively.

7. A threading apparatus as defined in claim 6 wherein the helix angle of the wall portion of the second axially extending groove is the same as the helix angle of the wall portion of the first axially extending groove.

8. A threading apparatus for producing threads as defined in claim 1 wherein:
both the tool carrier member and the support member include bores extending coaxially of the tool axis and coaxially of the respective carrier and support members; and
the spindle member has oppositely disposed, coaxial, cylindrical end portions fitting respectively in sliding relationship within the bores of the carrier member and the support member.

9. A threading apparatus for producing threads as defined in claim 8 wherein the first annular and axially extending grooves of the first torque transmitting means are formed in the cylindrical end portion of the spindle member fitting within the bore of the tool carrier member, and the tang of the first torque transmitting means is mounted in the carrier member and projects into the joined grooves.

10. A threading apparatus as defined in claim 9 wherein the second torque transmitting means includes a second axially extending groove with a helical sidewall and joining annular groove formed in the cylindrical end portion of the spindle member fitting within the bore of the support member, and another tang mounted in the support member and projecting into the second joined grooves.

* * * * *